United States Patent
Hwang

(12)
(10) Patent No.: US 6,715,100 B1
(45) Date of Patent: Mar. 30, 2004

(54) METHOD AND APPARATUS FOR IMPLEMENTING A WORKGROUP SERVER ARRAY

(76) Inventor: Ivan Chung-Shung Hwang, 13072 Stanton, Santa Ana, CA (US) 92705

(*) Notice: Subject to any disclaimer, the term of this patent is extended or adjusted under 35 U.S.C. 154(b) by 0 days.

(21) Appl. No.: 09/744,194
(22) PCT Filed: May 17, 2000
(86) PCT No.: PCT/US00/13595
§ 371 (c)(1), (2), (4) Date: Jan. 16, 2001
(87) PCT Pub. No.: WO00/72167
PCT Pub. Date: Nov. 30, 2000

Related U.S. Application Data

(63) Continuation-in-part of application No. 08/742,741, filed on Nov. 1, 1996, now Pat. No. 6,049,823.
(60) Provisional application No. 60/135,318, filed on May 20, 1999.

(51) Int. Cl.[7] .................................................. G06F 11/00
(52) U.S. Cl. ........................................................... 714/5
(58) Field of Search ............................... 714/5, 11, 48; 709/219, 203, 225, 226

(56) References Cited

U.S. PATENT DOCUMENTS

| | | | | |
|---|---|---|---|---|
| 6,014,319 A | * | 1/2000 | Kuchta et al. | 361/788 |
| 6,091,609 A | * | 7/2000 | Hutson et al. | 361/794 |
| 6,629,260 B1 | * | 9/2003 | Dancer et al. | 714/3 |
| 2003/0016515 A1 | * | 1/2003 | Jackson et al. | 361/796 |
| 2003/0088835 A1 | * | 5/2003 | Lindkvist et al. | 716/2 |

* cited by examiner

*Primary Examiner*—Robert Beausoliel
*Assistant Examiner*—Bryce P. Bonzo
(74) *Attorney, Agent, or Firm*—Leonard Tachner

(57) ABSTRACT

A method and apparatus for implementing a workgroup server array ideal for web-based Intranet, Extranet and Internet applications. The inventive server array comprises a plurality of team/workgroup computers (408) equipped with work-group-based direct-access servers and modular controlling devices (1), creating workgroup-based fault-tolerant and fail-over capabilities, providing console-based monitoring and management support, and accommodating highly available and scalable web-based applications with optimal performance. These workgroup server arrays can be used as the basic building blocks to construct large-scale server clusters, so that more users can be served concurrently. Furthermore, workgroup-server-array-based architecture is created for building various highly available, scalable and mission critical server clusters, which enable distributed computing services for enerris-based Intranet, Extranet and Internet mission critical applications.

50 Claims, 11 Drawing Sheets

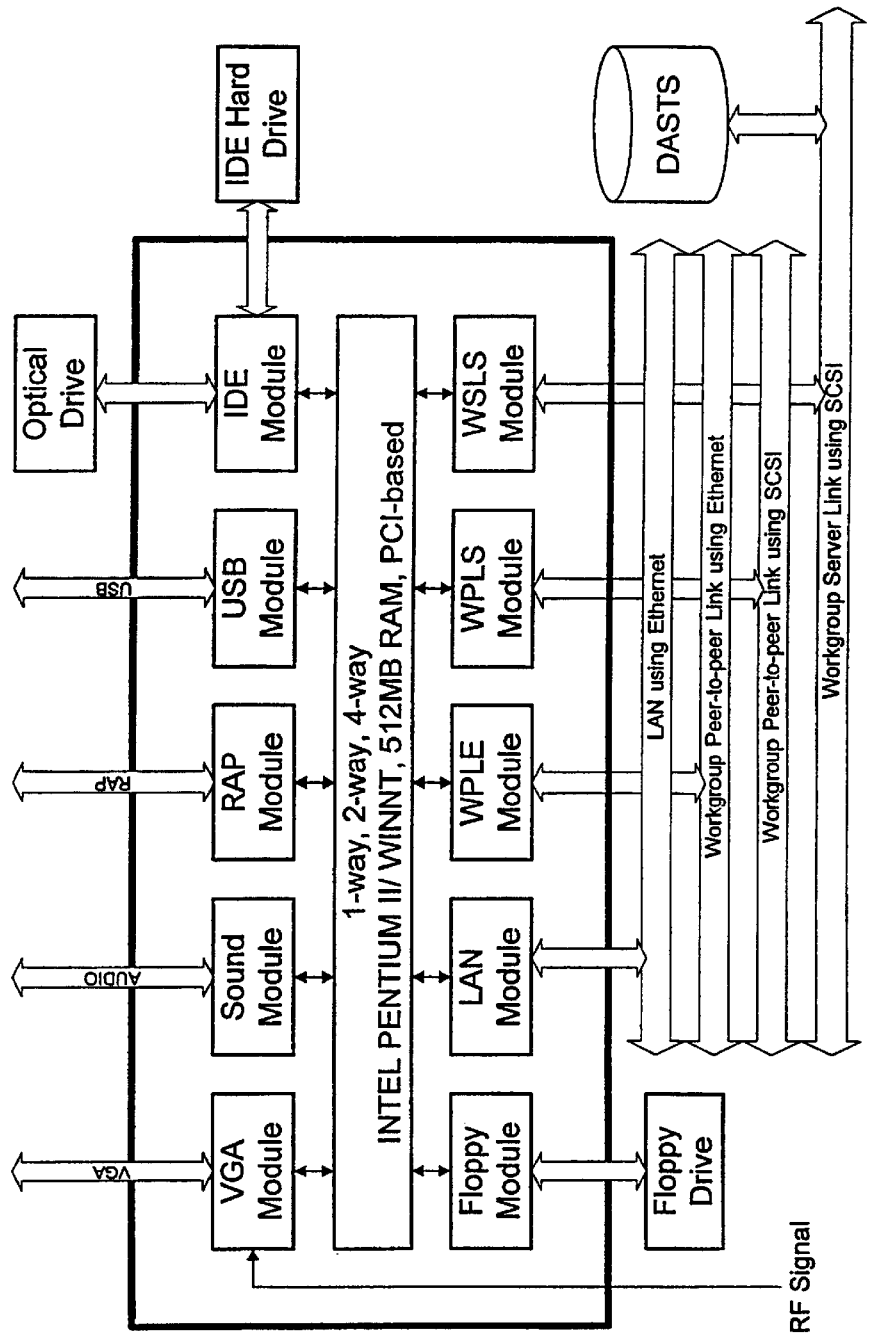
FIG. 1A: TeamProcessor

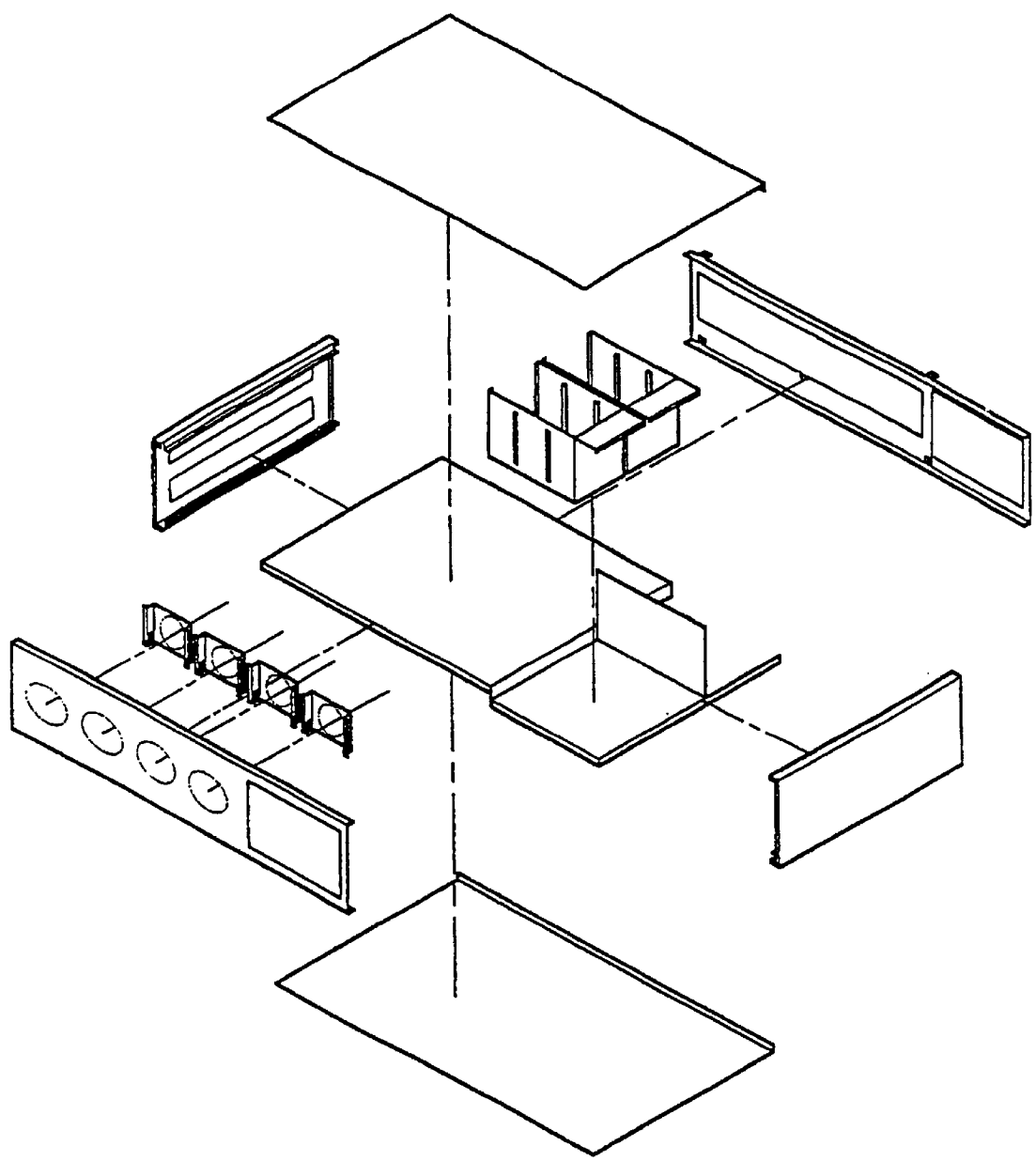
FIG. 1B: Chassis

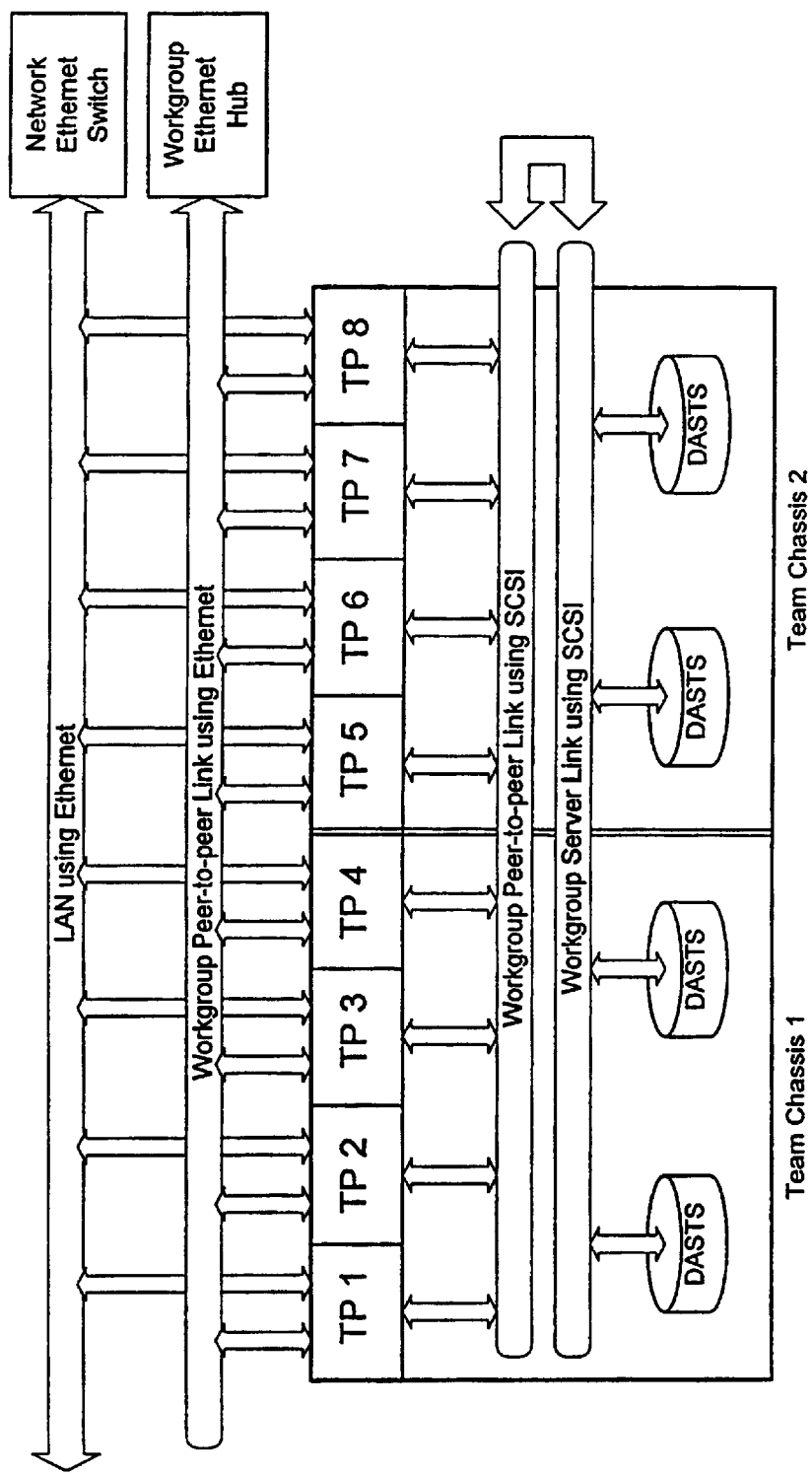
FIG. 1C: TeamServer

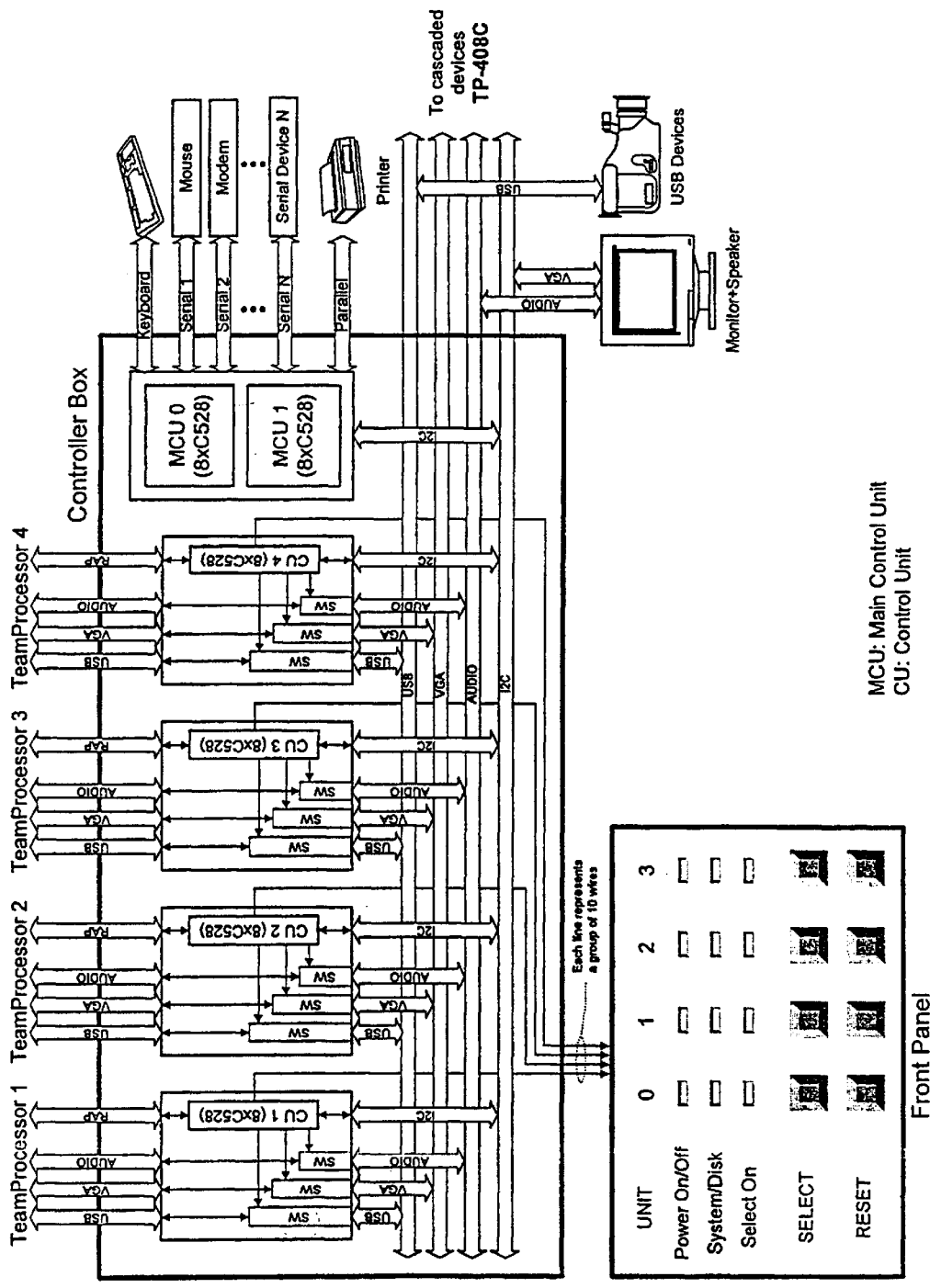
FIG. 1D: TeamPanel

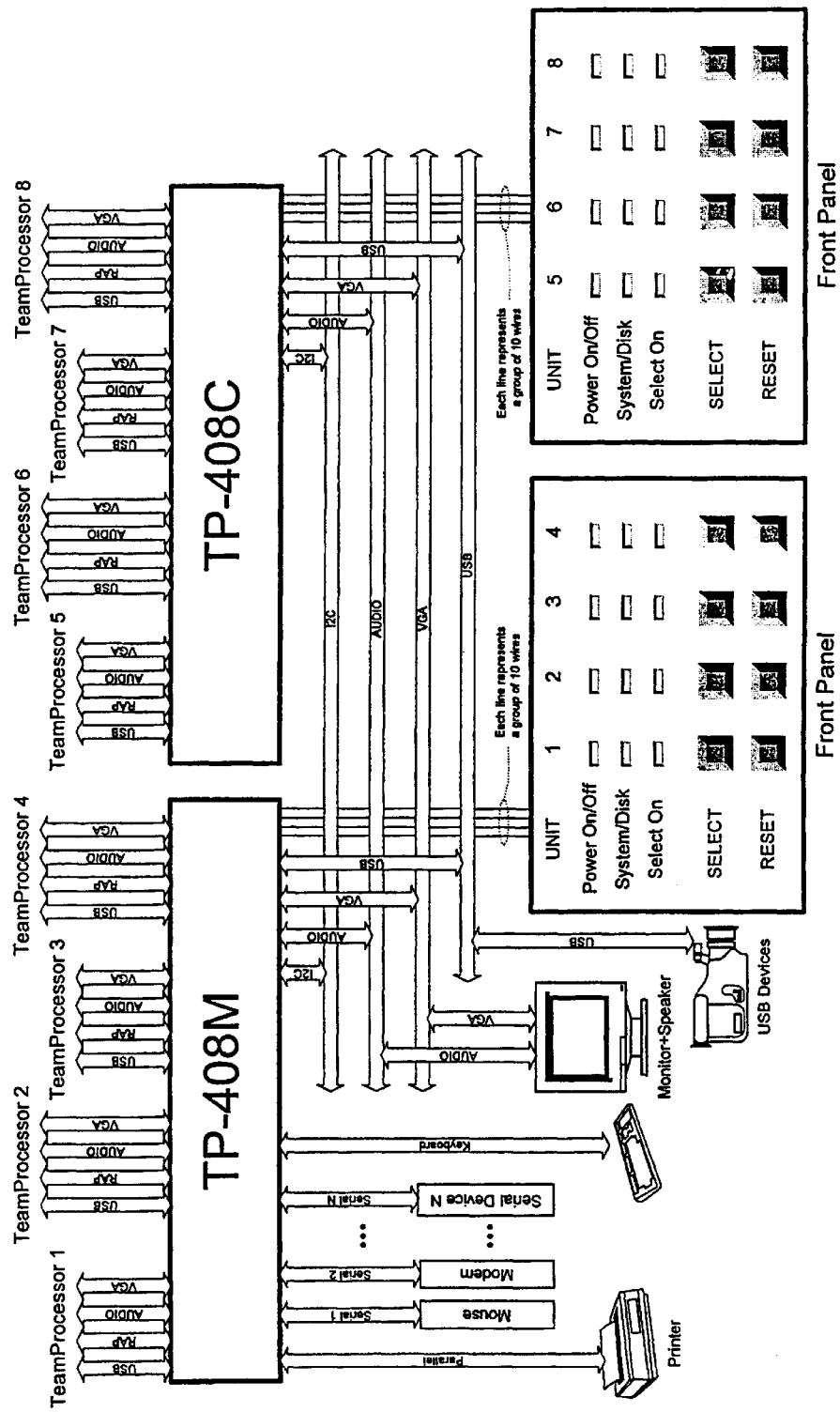
FIG. 1E: Cascading TeamPanels

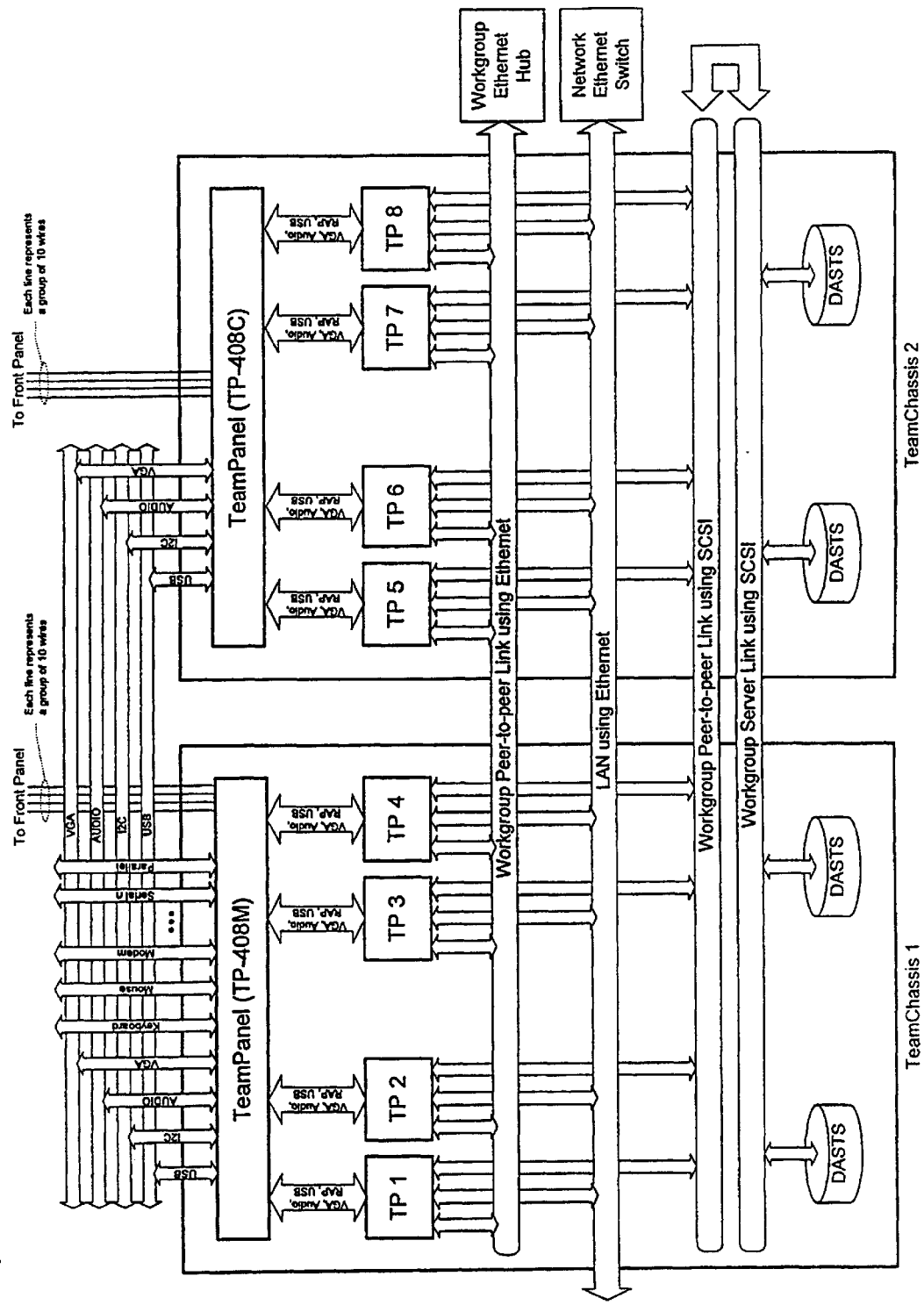
FIG. 2A: Workgroup Server Array (Configuration 1)
(8 TeamProcessors, 4 TeamServers, 2 TeamPanels, 2 TeamChassis)

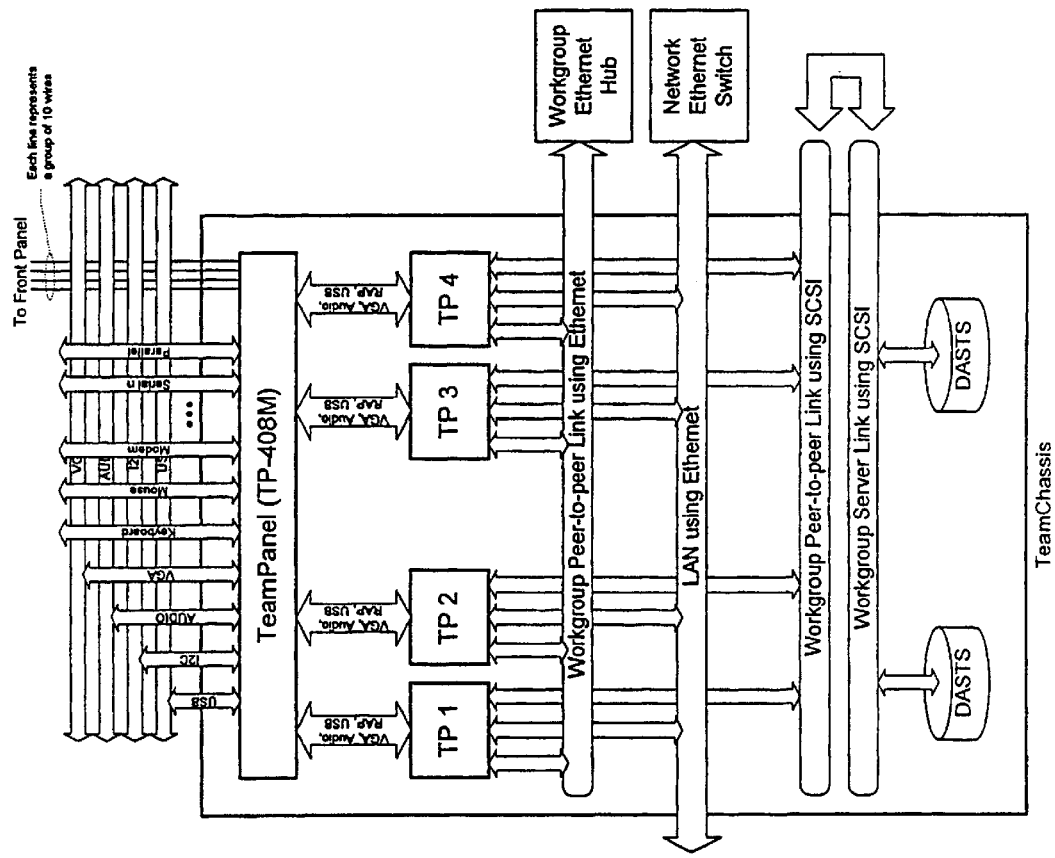
FIG. 2B: Workgroup Server Array (Configuration 2)
(4 TeamProcessors, 2 TeamServers, 1 TeamPanel, 1 TeamChassis)

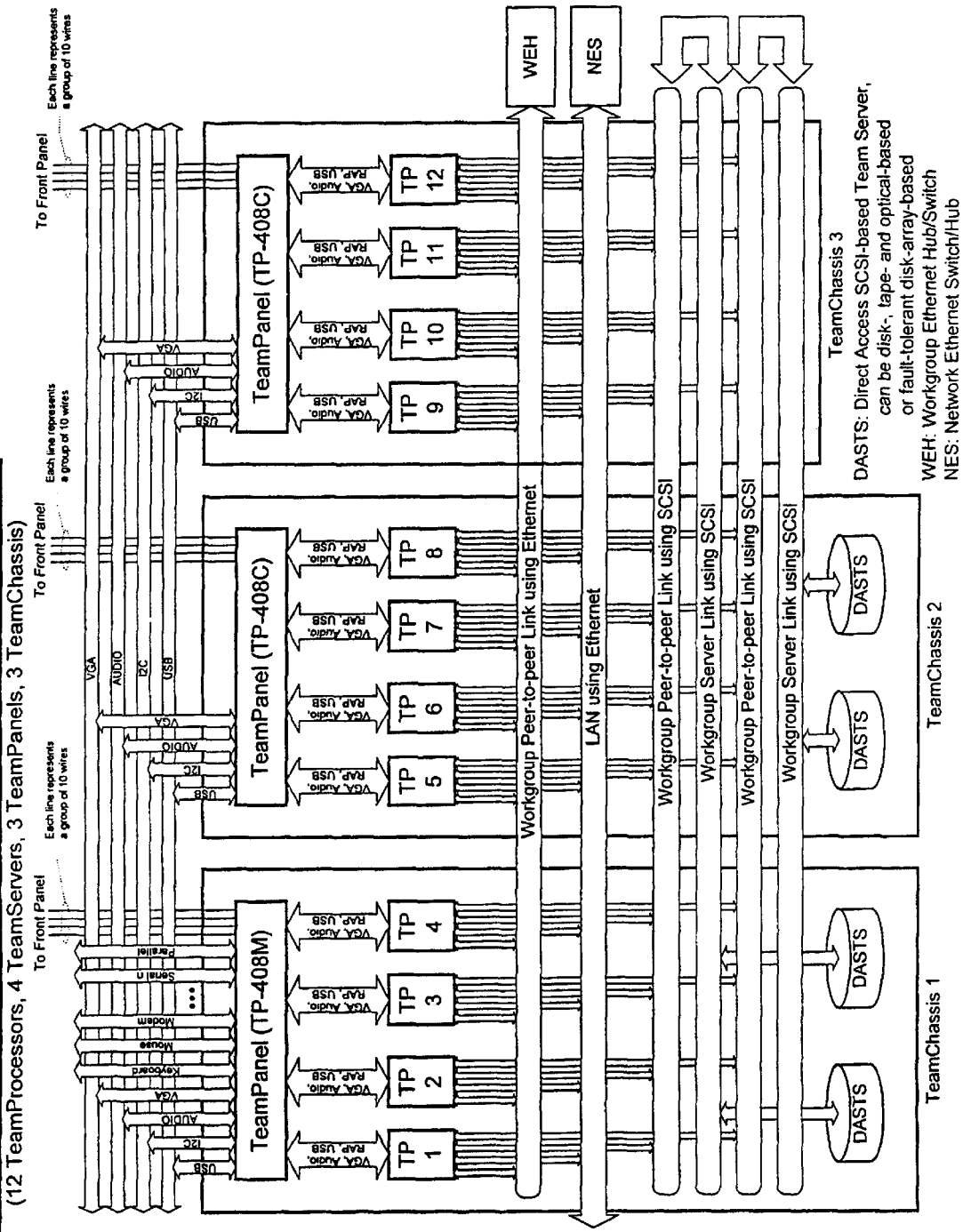
FIG. 2C: Workgroup Server Array (Configuration 3)
(12 TeamProcessors, 4 TeamServers, 3 TeamPanels, 3 TeamChassis)

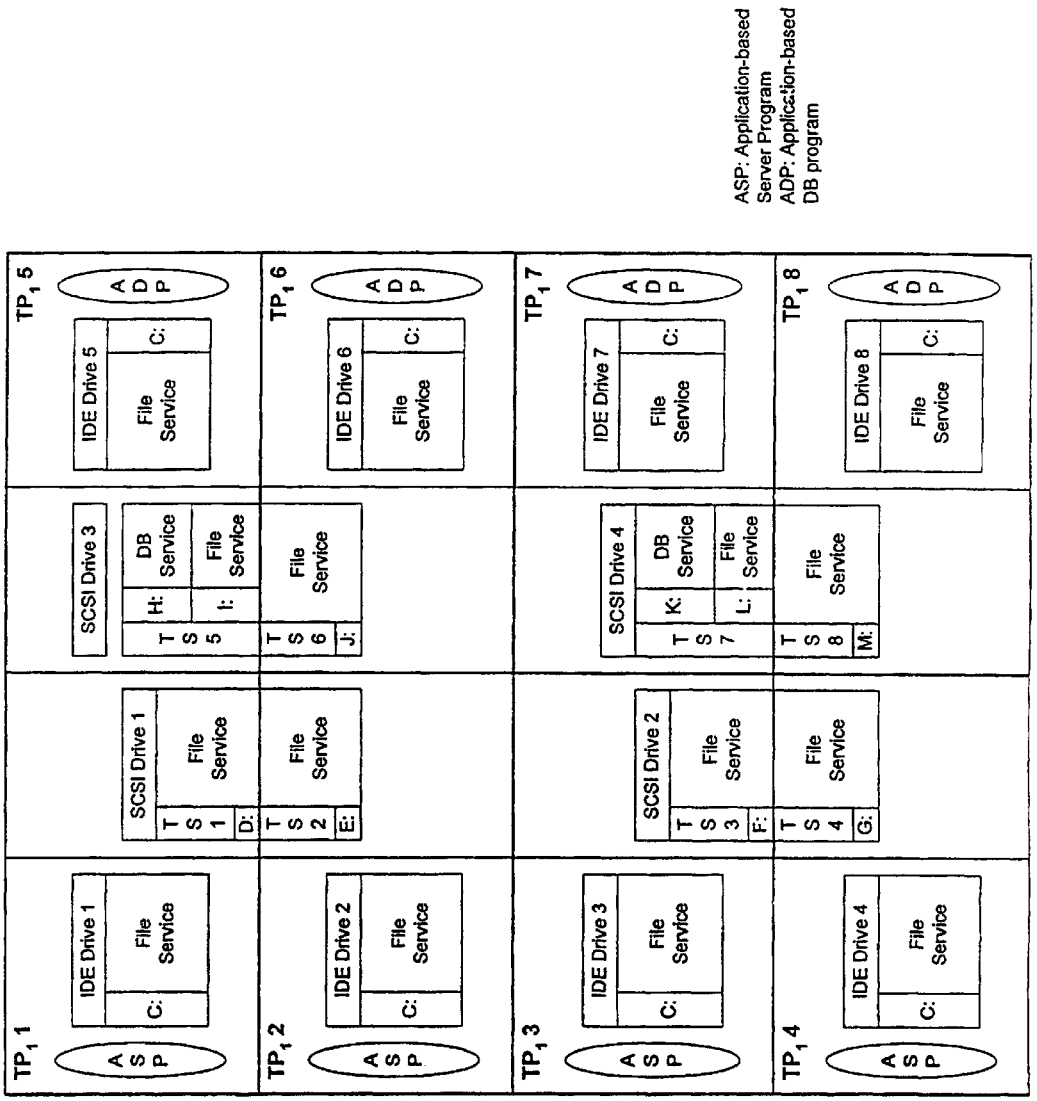
FIG. 3A: Data Structures of Workgroup Server Array (WSA-1)

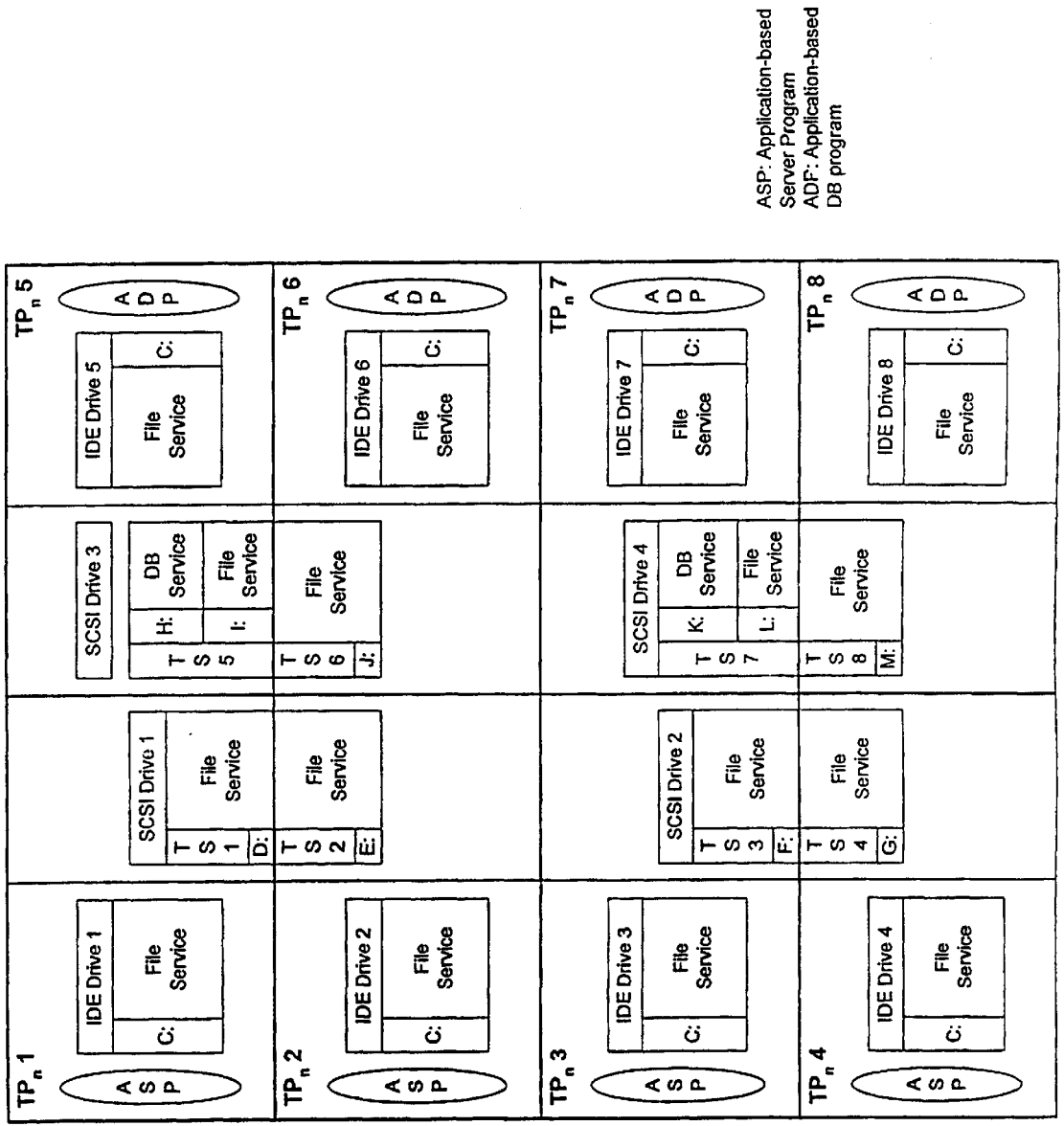
FIG. 3B: Data Structures of Workgroup Server Array (WSA-n)

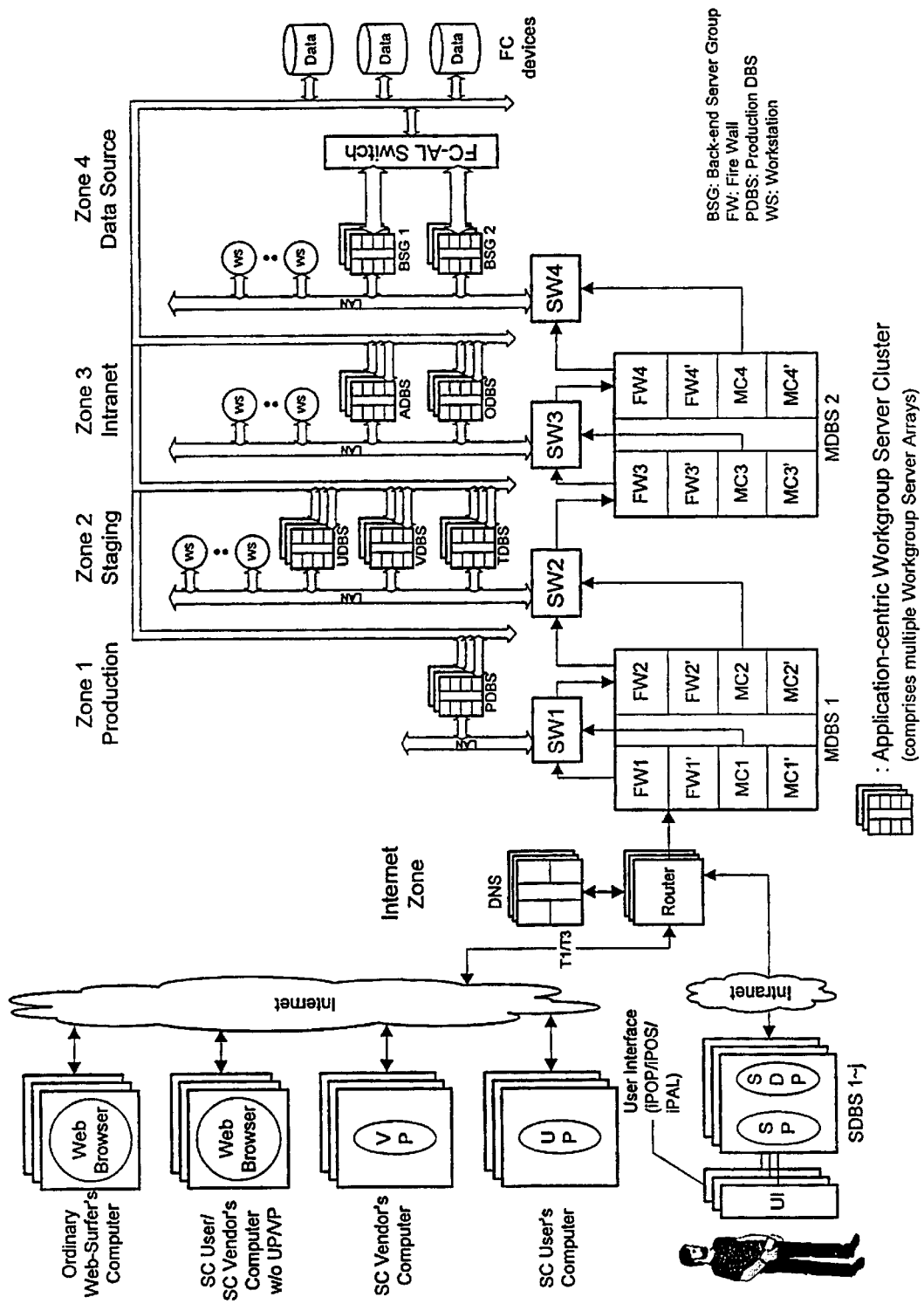
FIG. 4: Mission-critical Web-based Application Architecture

METHOD AND APPARATUS FOR IMPLEMENTING A WORKGROUP SERVER ARRAY

CROSS-REFERENCE TO RELATED APPLICATIONS

This application takes priority from Provision Application Serial No. 60/135,318 filed May 20, 1999 which is a continuation-in-part of patent application Ser. No. 08/742,741 filed on Nov. 1, 1996 entitled "A MULTI SERVER, INTERACTIVE, VIDEO-ON-DEMAND TELEVISION SYSTEM UTILIZING A DIRECT-ACCESS-ON-DEMAND WORKGROUP SERVER" and now U.S. Pat. No. 6,049,823 issued Apr. 11, 2000.

BACKGROUND OF THE INVENTION

1. Field of the Invention

The present invention generally relates to a server cluster, and more particularly to a method and apparatus for implementing a workgroup server array and its architecture for building various server clusters to accommodate scalable web-based Intranet, Extranet and Internet mission-critical applications.

The inventive server array comprises team/workgroup computer equipped with workgroup-based direct-access servers and controlling devices, as described in applicant's U.S. Pat. No. 5,802,391 entitled "DIRECT-ACCESS TEAM/WORKGROUP SERVER SHARED BY TEAM/WORKGROUPED COMPUTERS WITHOUT USING A NETWORK OPERATING SYSTEM". Furthermore, this inventive server array creates a workgroup-server-array-based architecture, which can be employed to construct various highly available, scalable and mission-critical server clusters.

2. Prior Art

The explosion of innovative Internet technology is significantly influencing the way applications are written and deployed. The hundreds of thousands of Internet web sites that were once static "brochure-ware" are quickly becoming highly interactive Internet applications with transactional capabilities. Inside large corporations, developers are using Web technology to integrate enterprise applications into large-scale Intranets. Between corporations, business partners are building secure Extranets to streamline their supply chains and improve communication.

As web-based applications expand on the Internet, and on enterprise Intranets and Extranets, the functions they perform are becoming increasingly mission critical. Moreover, as businesses continue to apply web-based technologies to mission critical tasks, they will require sophisticated approaches for making their applications highly available and scalable.

In order to achieve high scalability and availability requirements, the trend is toward systems that involve many servers working together, i.e., server clusters to deliver applications that the end users request. Furthermore, a large-scale web-based service requires architecture to build server clusters, so that availability, scalability, reliability, performance, management and security issues can be accommodated.

However, current technologies available for building a highly scalable, highly available and mission-critical web-application-based server cluster by using a plurality of individual servers, tend to create a single-server-based 3-tier architecture, hereinafter referred as SS-3 architecture. This SS-3 architecture generally requires first-tier components, which are load balancers, second-tier components, which are application servers, and third-tier components, which are database and file servers. Each individual server, which can be PC-based, super-micro-based or mini-computer-based, comprises multiple CPU's with parallel processing capabilities using an Operating System, such as WinNT, Solaris, Linux and Unix.

Based on SS-3 architecture, a highly available and scalable server cluster for web-based applications can thus be built. However, the architecture also creates the following disadvantages:

1. Pertaining to each tiered component a) Load balancers-Analyze all the incoming traffic and re-direct each individual web-based query/request to one of the available second-tiered application servers that are attached. The load balancer distributes requests to specific second-tiered web-based application servers based on the nature of the request and the availability and capability of the load-balanced web application server. There are three basic types of load balancers: switches, software balancers and appliance balancers. However, the Internet connection will likely be clogged if any of the above-mentioned load balancers is stressed.

b) Application servers-Receive the assignment from the first-tiered load balancer, carry out the web-based applications and interface with the third-tier database and file servers for application-oriented data retrieval. However, each application server may be different from one another, based on different hardware and software configuration, creating management complexity for the load balancer. In addition, each application server handles both loyalty-based and non-loyalty based queries, creating non-coherent program groups with different levels of security measures. Furthermore, each application server does not have the remote boot capability, unless a network-access-based secondary processor is included, so that if the primary processor of the server fails, the secondary processor accessed by other network-based management servers can then be triggered to reboot the primary processor.

c) Database/File servers—Are client-server-based servers that process database/file queries from all the second-tiered application servers deemed as clients. Since there is no differentiation between the loyalty-based and the non-loyalty-based traffic, application-oriented data for loyalty-based and non-loyalty-based are all sorted in one central file server and one database server, creating potential database/file retrieval bottlenecks if too many concurrent queries occur. Furthermore, if these file and database servers are implemented as part of a data center, which contains multiple distributed database and file servers that are linked to a plurality of SAN-enabled (storage-area-network) storage devices, the complexity of managing such a data center is high. It is due to the fact that complicated database software programs are required in both client-centric servers and server-centric servers. However, it is not ideal to lump application-oriented data and business sensitive data in one data center, because extra security measures, such as firewall filtering, have to be put forth to guard against any potential risk of being sabotaged by web-based browsing activities.

d) The inter-tier communication switches—Are required between the first tiered load balancer and the second-tiered application servers and between the application servers and the third-tiered file and database servers. Since every component is network-based, all the communication between servers is handled through these two switches, creating unnecessary inter-tiered traffic bottlenecks and management overhead.

e) More tiers means more components, which create more single-point failures—Based on SS-3 architecture, all the load balancers, application servers, file and database servers, routers and switches should have a fail-over scheme, so that mission critical applications can be maintained without failure. Even though the overall fail-over scheme can be developed, it is not efficient and cost-effective, due to the fact that there are too many hardware configurations and software programs involved.

2. Server cluster management a) The monitoring and management of single-server-based server clusters become complicated because of the complexity of each component in regard to inter-tiered communication. Single software upgrades tend to create software incompatibility due to the fact that there are too many involved software programs that also may need to be upgraded from various venders.

b) The overall performance is not easily optimized. Once a server cluster is built based on SS-3 architecture, it has to meet the criteria of at least handling steady-state operation smoothly and accommodating peak-time operation without glitches. However, there are no distributed small-scale optimal points that can be gauged, thereby adding uncertain factors in controlling the steady-state operation and restricting necessary measures in dealing with the peak-time operation.

c) High availability and cost-effective linear scalability are difficult to maintain if too many database centric requests are to be serviced concurrently due to high-speed web access is prevalent. Currently, web-based queries are based on 56 kbps narrow-band transfer rate and the related services are centered in web-page delivery. However, if the prevalent data transfer rate jumps to 1 Mbps or higher by using cable modem or ADSL and the prevalent services are centered in personal database-centric web-page delivery, the SS-3 architecture will have difficulties in maintaining high availability. It is due to the fact that 20 times more traffic is generated within the server duster, stressing the capability of the fail-over load balancers, creating bottlenecks between inter-tiered communications and severely diminishing the return on the SS-3-based scalability.

SUMMARY OF THE INVENTION

The aforementioned sever cluster, which is based on single-server-based architecture, can not adequately provide highly available and scalable solutions for large-scale web-based mission-critical applications efficiently and cost-effectively.

The objects of this invention are accomplished by not only resolving the above-mentioned deficiencies, but also by devising technological breakthroughs in building a workgroup-based server-array and its architecture so that highly available and scalable solutions for large-scale web-based mission-critical applications can be accommodated efficiently and cost-effectively.

The present invention employs a plurality of team/workgroup computers, hereinafter referred to as TeamProcessors, housed in workgroup-computer chassis, hereinafter referred to as TeamChassis, together with a plurality of workgroup-based direct-access servers, hereinafter referred to as TeamServers, as described in Applicant's U.S. Pat. No. 5,802,391. Based on these building blocks, various workgroup server array configurations can be implemented.

The present invention further comprises a unique modular workgroup-based controlling and monitoring device, hereinafter referred to as TeamPanel, which provides local and remote monitoring and reboot management, task switching, load balancing and fail-over control functions. In addition, any particularly configured workgroup server array can be accommodated either by a single or by multiple TeamPanels cascaded together.

The present invention further comprises a plurality of the above-mentioned Team-building blocks, so that preferred workgroup server arrays for various configurations can be built to provide a number of unique underlying functions. Based on the preferred data structure and data flow, these underlying functions, include, but are not limited to, internal/external controlled task switching, workgroup-based device sharing, load balancing, fail-over, monitoring and management, security and performance measurements.

The present invention and its related architecture, resolve the deficiencies inherent in the conventional single-server-based architecture by eliminating unnecessary network-access-based components and replacing them with workgroup-based direct-access components, thus reducing unnecessary network traffic and decreasing the number of single-point failures.

Furthermore, a plurality of workgroup server arrays based on a specific application can be formed as a workgroup server cluster, so that highly available and scalable mission critical web services based on that particular application can be accommodated. In addition, a plurality of various application-based workgroup server clusters can be constructed in both serial and parallel manners to provide large scale multi-application web-based solutions for accommodating thousands of users concurrently even with broadband Quality of Service (QOS) intact.

BRIEF DESCRIPTION OF THE DRAWINGS

The aforementioned aspects and advantages of the present invention, as well as additional aspects and advantages thereof will be more fully understood hereinafter, as a result of a detailed description of a preferred embodiment thereof, when taken in conjunction with the following drawings in which:

FIG. 1A is a functional block diagram illustrating the preferred workgroup processor, i.e., TeamProcessor, as one of the apparatuses for building a preferred workgroup server array.

FIG. 1B is a functional block diagram illustrating the preferred workgroup computer chassis, i.e., TeamChassis, which can house multiple TeamProcessors, as one of the apparatuses for, building a preferred workgroup server array.

FIG. 1C is a functional block diagram illustrating one of the preferred integrated configurations, which comprises eight (8) preferred TeamProcessors networked and work-grouped together via multiple links, as well as four (4) preferred TeamServers, as one of the embodiments of the present invention.

FIG. 1D is a functional block diagram illustrating the preferred modular workgroup-based monitoring and management, i.e., TeamPanel, which comprises four (4) basic control units and one (1) main control unit with dual processors for connecting up to four (4) TeamProcessors, and can be enclosed in a TeamChassis with Front-Panel built-in.

FIG. 1E is a functional block diagram illustrating a modular cascading of a primary TeamPanel and a secondary TeamPanel, accommodating an eight (8) TeamProcessor configuration.

FIG. 2A is a functional block diagram illustrating a preferred workgroup server array in accordance with one embodiment of the present inventive system, comprising eight (8) TeamProcessors, four (4) SCSI-disk-based TeamServers and two (2) cascaded TeamPanels, all evenly enclosed in two (2) TeamChassis.

FIG. 2B is a functional block diagram illustrating a preferred workgroup server array, in accordance with one embodiment of the present inventive system, comprising four (4) TeamProcessors, two (2) SCSI-disk-based TeamServers and one (1) TeamPanel, all enclosed in one TeamChassis.

FIG. 2C is a functional block diagram illustrating a preferred workgroup server array in accordance with one embodiment of the present inventive system, comprising twelve (12) TeamProcessors, six (6) SCSI-disk-based TeamServers linked using dual SCSI channels and three (3) cascaded TeamPanels, all evenly enclosed in three (3) TeamChassis.

FIG. 3A is a functional block diagram illustrating a methodical implementation of a preferred data structure and data flow onto a preferred eight (8) TeamProcessor server array in which a plurality of underlying functions for use with internal operations, fail-over, load balance, security, management and optimal performance measurements can all be installed.

FIG. 3B is a functional block diagram illustrating a workgroup server cluster comprising a plurality of single-application workgroup server arrays, each providing a mutually exclusive database segment based on the optimal performance measurement, so that inter workgroup-based underlying functions, such as high availability and scalability can be installed.

FIG. 4 is a functional block diagram illustrating a preferred integration of various security zone-based application-oriented workgroup server clusters and backend database servers using FC-AL hub or FC Switches, creating a preferred data center/warehouse configuration in a distributed computing environment for web-based mission-critical applications.

DETAILED DESCRIPTION OF A PREFERRED EMBODIMENT

Reference will be made to the preferred embodiment of the invention illustrated in FIGS. 1–4, based on team/workgroup computers used as the preferred building blocks of workgroup server array.

A team/workgroup computer is a group of computers, which are workgrouped together via a workgroup peer-to-peer link, and can all be connected to a number of direct-access workgroup servers via a workgroup server link. The details are described in Applicant's U.S. Pat. No. 5,530,892 entitled "SINGLE CHASSIS MULTIPLE COMPUTER SYSTEM HAVING SEPARATE DISPLAYS AND KEYBOARDS WITH CROSS INTERCONNECT SWITCHING FOR WORK GROUP COORDINATOR" and in Applicant's U.S. Pat. No. 5,802,391 entitled "DIRECT-ACCESS TEAM/WORKGROUP SERVER SHARED BY TEAM/WORKGROUPED COMPUTERS WITHOUT USING A NETWORK OPERATING SYSTEM". In addition, the workgroup peer-to-peer link and the workgroup server link can be connected together, if they are using the same physical layer cabling, capable of running both storage-based and communication-based data link protocols, such as modified SCSI, as described in both of the aforementioned Patents. These workgrouped computers, each hereinafter referred to as TeamProcessor, are based on either the same or different CPU/OS platforms and these direct-access workgroup servers, each hereinafter referred to as TeamServer, can be formatted with the same file system that is supported by different operating systems. TeamServers can be implemented with disk-based, tape-based and optical-based drives, as well as implemented with fault-tolerant disk-arrays.

Each TeamProcessor, based on a particular OS, is installed with that particular OS-centric workgroup server link interface card, i.e., TeamServer card, to recognize all the TeamServers as the direct-access local drives. However, each TeamServer has only one primary TeamProcessor that has the absolute privilege to read, write and create files. Furthermore, one physical hard disk drive, as well as a fault-tolerant disk array can be partitioned and formatted into multiple logical drives, each logical drive being controlled by each different TeamProcessor as the primary processor. Even though all of these TeamProcessors are connected on the internal network link and installed with network operation system, these TeamServers are not mapped as network-accessible drives throughout TeamProcessors.

Moreover, a highly integrated team/workgroup computer, hereinafter referred to as TeamPro computer, contains multiple TeamProcessors, all enclosed in one workgroup TeamChassis as described in Applicant U.S. Pat. No. 5,577,205 entitled "CHASSIS FOR A MULTIPLE COMPUTER SYSTEM". The TeamPro computer is further equipped with a monitoring and management device, i.e., TeamPanel as a means to control and interface with each TeamProcessor through one console monitor and one RAP (remote-access-port)-based device, which is comprised of two (2) serial ports, one (1) keyboard, one (1) system LED, one (1) buzzer and one (1) reset button as described in U.S. Pat. No. 5,530,892 entitled "SINGLE CHASSIS MULTIPLE COMPUTER SYSTEM HAVING SEPARATE DISPLAYS AND KEYBOARDS WITH CROSS INTERCONNECT SWITCHING FOR WORK GROUP COORDINATOR".

As shown in FIG. 1A, the preferred Team/workgroup computer-based TeamProcessor, based on a PC computing platform, generally contains either one-way, two-way or four-way Intel Pentium CPUs WINNT PCI-based motherboard with 128 MB RAM, on a floppy disk interface module, an IDE interface module, a VGA card module, a Sound card module, a USB module, a parallel interface module, a RAP module, a network link LAN module using Ethernet, a workgroup peer-to-peer link module using Ethernet, a workgroup peer-to-peer link module using SCSI and a workgroup server link module using SCSI. A TeamProcessor further is equipped with module-based external peripheral drives and devices such as floppy disk, IDE disk and optical drives, a VGA monitor, a USB-based digital camera, a mouse, a network Ethernet-based hub and switches, SCSI disk and tape drives, a printer and a set of speakers.

As shown in FIG. 1B, the preferred workgroup computer chassis, i.e., TeamChassis, encloses four (4) CPU-card-based TeamProcessors and a number of module-based drives and devices, such as IDE-based disk and optical drives, SCSI drives and TeamPanel. The same TeamChassis can also enclose two (2) mother-board-based TeamProcessors with various module-based drives and devices. TeamChassis can further be equipped with internal redundant power supplies, smart-power management, hot swappable disks and fans, and external UPS.

The maximum number of individual TeamProcessors that can be workgrouped together to form a workgroup server array is constrained by the internal workgroup server link. If the workgroup server link uses SCSI-II, the effective length to ensure proper data transmission is six (6) meters and the number of nodes that can be attached is sixteen (16). That is why TeamChassis, which can enclose at least two (2) TeamProcessors, is used to support a better workgroup peer-to-peer link-based SCSI cable scheme, as the first TeamProcessor extends the cable from external and the second extends the cable for external connection. The same TeamChassis can also house four (4) CPU-card based TeamProcessors, allowing the SCSI cable to be even shorter. Currently, there are 4 different SCSI standards, from FAST SCSI, Ultra SCSI, Ultra2, LVD SCSI and Ultra3, LVD SCSI. Each standard has both narrow (8-bit) and wide (16-bit) configurations. Therefore, the preferred SCSI implementation is to use Ultra-wide LVD SCSI, which has the maximum data rate at 160 MB/sec with the cable length up to twelve (12) meters.

FIG. 1C shows a preferred workgroup link integration, in which eight (8) preferred TeamProcessors are linked by a workgroup peer-to-peer link using SCSI and four (4) SCSI hard-disk-based TeamServers are linked by a workgroup server link using SCSI. These TeamProcessors and TeamServers are connected together by using the same SCSI cable. By doing so, every TeamProcessor can direct access each TeamServer without involving other TeamProcessors, especially the primary TeamProcessor that has the absolute privileges. As illustrated in FIG. 1C, each SCSI-disk-based TeamServer has two (2) logical drives and each TeamProcessor is allocated one logical drive and enabled with absolute privilege. A TeamServer can only be accessed in a read-only fashion by other non-primary TeamProcessors.

FIG. 1C also illustrates the workgroup peer-to-peer link using Ethernet via TeamLink cards with Ethernet hub, so that if the workgroup peer-to-peer link using SCSI is faulty, the workgroup peer-to-peer link using Ethernet can be the alternative communication link, or vice versa. The major benefit of implementing workgroup peer-to-peer link using Ethernet is that the inter-TeamProcessor communications within the workgroup won't adversely affect the network traffic, as well as other workgroups' inter-TeamProcessor communications. The workgroup peer-to-peer link using Ethernet can accommodate various inter-TeamProcessor communications, such as mapped-drive-based, socket-based, and security-encryption/decryption-based. Other equivalent peripheral buses besides SCSI can also be adopted as the de facto link that can merge workgroup peer-to-peer link and workgroup server link together, as long as their data-link layer is capable of implementing storage-based and communication-based protocols, either standardized or proprietary. However, depending on the configuration, the workgroup peer-to-peer link based on any of applicable peripheral buses may not be necessary, as long as the workgroup server link and the workgroup peer-to-peer link using Ethernet are established.

FIG. 1D illustrates the preferred version of TeamPanel, which comprises four (4) basic control units and one main control unit and connects up to four (4) TeamProcessors via RAP, VGA, USB and audio port. The basic control unit contains a micro-processor and three (3) switches controlled by the micro-processor for allowing VGA signal, audio signal and USB signals to flow through onto the common VGA, audio, USB buses that link to other basic control units and the main control unit. In addition, there is a TeamPanel-based communication link using $I^2C$, which connects to other basic control units and the main control unit and there is a set of ten (10) interface signals, which connect to the front panel.

The preferred main control unit may contain dual microprocessors for fault-tolerance, which provide the physical layer interfaces to hook up with a keyboard, serial-based devices and a printer, categorized as the workgroup sharable devices among workgrouped TeamProcessors. The main control unit also keeps various status tables for tracking each workgrouped TeamProcessor's vital signs, CPU load and activities, as well as usage tables for supervising common buses and peripheral devices so that after checking the tables for no conflicting usage, it can allow requests from TeamProcessors to be carried out sequentially.

The preferred front-panel contains two interactive push-buttons; one for selecting the chosen TeamProcessor for external VGA-based monitor to display and for the external keyboard and the mouse to control, the other one for resetting the chosen TeamProcessor. There are also three sets of LED's, which indicate power on/off, primary system disk activity and select enabled, respectively. Both the TeamPanel functional board and the front-panel are enclosed in a TeamChassis so that the cabling scheme is easier to arrange.

The default TeamProcessor that controls the TeamPanel is called TeamManager. For workgroup communication to TeamManager, any TeamProcessor can first transfer the message to its attached control unit via COM2 of RAP, and then the control unit re-packs the message with $I^2C$ protocol header and notifies the main control unit via TeamPanel internal link using $I^2C$. Once the main control unit allows the linkage to take place, the basic control unit can communicate directly with the TeamManager through TeamPanel internal $I^2C$ link, thereby, for instance, reporting the current status of its attached TeamProcessor. Moreover, the TeamPanel internal link can be used as an alternative communication link to workgroup peer-to-peer links using SCSI and Ethernet. Also for fail-over purpose, replace COM1-based mouse device with USB-based mouse. Therefore, if COM2 of RAP should fail, then COM1 of RAP can take over and provide the data communication between TeamProcessor and its attached basic control unit.

FIG. 1E shows two (2) TeamPanels cascaded together to connect eight (8) preferred workgrouped TeamProcessors. The first TeamPanel, i.e., TP-408M and the second TeamPanel, i.e., TP-408C are connected via the common VGA, Audio, USB and $I^2C$ buses, whereas TP-408C doesn't have the main control unit, so that the main control unit in TP-408M will supervise all the basic control units in TP-408C. The TeamManager which controls the first TeamPanel, will also be the TeamManager of the second TeamPanel. For communication to TeamManager, any TeamProcessor of the second TeamPanel, will first transfer the message to its attached control unit via COM2 of RAP and then the control unit re-packs the message with $I^2C$ protocol header and notifies the main control unit in the first TeamPanel via internal $I^2C$ link. Once the main control unit allows the linkage to take place, the basic control unit of the second TeamPanel can communicate directly with the TeamManager of the first TeamPanel through TeamPanel internal $I^2C$ link. Based on the same scenario, any particularly configured workgroup server array can be accommodated either by a single TeamPanel or by multiple TeamPanels cascaded together. The front-panel of each TeamPanel can be enclosed in each TeamChassis, or can be extended to an external box for easy monitoring and control of multiple TeamPanels. Multiple TeamChassis that contain all the workgroup server array's TeamProcessors can be housed in a TeamRack, which can also house additional TeamServers in additional TeamChassis and is further equipped with a cable distribution box that houses all the inter-TeamChassis cables, as well as all the incoming and outgoing cables.

FIG. 2A is a functional block diagram illustrating a preferred workgroup server array in accordance with one embodiment of the present inventive system, comprising eight TeamProcessors, four SCSI-disk-based TeamServers and two cascaded TeamPanels, enclosed in two TeamChassis that can be further housed in a TeamRack.

FIG. 2B is a functional block diagram illustrating a preferred workgroup server array in accordance with one embodiment of the present inventive system, comprising four TeamProcessors, two SCSI-disk-based TeamServers and one TeamPanel, enclosed in one TeamChassis that can be further housed in a TeamRack.

FIG. 2C is a functional block diagram illustrating a preferred workgroup server array in accordance with one embodiment of the present inventive system, comprising twelve TeamProcessors, six SCSI-disk-based TeamServers linked by two workgroup server links using dual SCSI channels, and three cascaded TeamPanels, enclosed in three TeamChassis that can be further housed in a TeamRack.

FIG. 3A illustrates a preferred configuration with defined data flows, which are designed to carry out various underlying functions using an eight (8)-TeamProcessor workgroup server array as shown in FIG. 2A. Based on the preferred configuration, eight (8) TeamProcessors can be functionally classified into two groups: 1) Application/file service processors (TP1–TP4), 2) database/file service/load balance/firewall processors, (TP5–TP8). Each TeamProcessor has its primary SCSI-disk-based TeamServer, which can be operated as a read-only TeamServer, hereinafter referred to as secondary TeamServer, for other seven TeamProcessors. Therefore, during the boot up, each TeamProcessor will recognize one IDE-based system drive, together With one primary TeamServer and seven secondary TeamServers, functioning as workgroup direct-access servers without using the NOS mapping scheme. In addition, the above primary and secondary TeamServers accessed by all the workgrouped TeamProcessors can also be implemented with multiple fault-tolerant disk arrays and with dual-channel TeamServer cards to distribute traffic on two SCSI channels.

Application/file service-based TeamProcessors TP1–TP4, each are capable of handling HTTP-based application-oriented web queries from Internet and generating transaction batch files that are written onto both the system IDE drive and its primary TeamServer. Database/file service-based TeamProcessors TP5–TP8, each are capable of handling FTP-based or proprietary real-time socket port-based database-oriented web queries from Intranet and Extranet and generating transaction batch files that are to be written onto both the system IDE drive and its primary TeamServer.

In addition, TeamProcessor TP5 and TP7, each maintains an application-specific workgroup database that is installed on its primary TeamServer. These two databases are basically the same at the end of the day. The database controlled by TP5 will update during the day based on each batch transaction file generated from TeamServer1-TeamServer4 within a defined time period (t). The database controlled by TP7 will be updated at the end of the day based on all the batches generated from TeamServer1-TeamServer4 during the day. TP6 will be handling mostly FTP-based database-oriented web queries from the Intranet, so that TP5 can retrieve from TeamServer6 and update the database every t period. TP5 will also update the database instantly due to the proprietary real-time socket-port-based database queries from the Intranet. TP8 will be the default TeamProcessor, i.e., TeamManager that controls those two TeamPanels.

Based on the preferred server-pair configuration, a number of unique functional services can be established for the inventive workgroup server array, hereinafter referred as WSA.

One of the preferred methods as to regarding WSA server coordination and supervisory services can be implemented such that TeamManager (TP8) coordinates all workgrouped TeamProcessors and generates management-based activities. The activities include the monitoring of each TeamProcessor's Inventory, disk space and CPU usage, which can be generated by the installed OS on each TeamProcessor, as well as the alerts of intrusion, removal and failure that may be taking place on each workgrouped TeamProcessor. Each TeamProcessor will routinely pack the management-based status information and send it via COM2 of RAP to its control unit, which notifies the main control unit and waits for OK to send instruction from the main control unit via TeamPanel internal 12C link. Once the OK signal is received, that particular TeamProcessor can direct communication from its control unit to the control unit of TeamManager, which subsequently sends the status information via COM2 of RAP to TeamManager. TeamManager will always keep a management-based status table regarding all the workgrouped TeamProcessors.

One of the preferred methods regarding WSA internal front-panel switching services can be implemented such that upon requests from itself or any TeamProcessor to check a particular TeamProcessor is still functioning or not, TeamManager will send the request to the main control unit, which will further send a diagnostic request to the control unit of that particular TeamProcessor. If there is no response, the main control unit will send a notice to the control unit of TeamManager, which sends the notification to TeamManager via COM2 of RAP. Then, TeamManager can send the alarm message to the LAN-based management console via network link and wait for the response from the operator. The operator can take over the control of TeamManager via management console computer by running Carbon-Copy or similar software. In addition, TeamManager is equipped with a video capture card and the common VGA bus is also hooked up to a NTSC converter, so that any TeamProcessor's VGA display can be recaptured into the TeamManager's VGA display. Therefore, TeamManager can be instructed to capture the screen display of the failed TeamProcessor by sending "select" request to the main control unit, which also will allow the subsequent communication from the control unit of TeamManager to the control unit of the failed TeamProcessor. The operator can also send the keyboard strokes to that failed TeamProcessor and act accordingly and save diagnosis file on TeamManager for further analysis. If the operator should decide to reset the failed TeamProcessor, TeamManager will be instructed to send "Reset" command to the control unit of the failed TeamProcessor. That particular control unit will trigger the reset line that links directly to that failed TeamProcessor and reset it. The booting up process can be captured, displayed and saved on TeamManager, so that the operator at the remote management console computer can watch and interact step-by-step with the boot-up process. Moreover, the technical personnel can further analyze based on the save files of diagnosis to determine the location of the problem and derive the solution.

One of the preferred methods regarding WSA onsite front-panel switching services can be implemented such that a local onsite operator can use the front panel on the TeamChassis to view, control and reset any of the Team-Processors using the TeamPanel-based workgroup devices, such as a VGA monitor, a set of speakers, a keyboard and a mouse. Upon any push-button request on the panel for "select" and "reset", whose signals directly link to the main control unit, the main control unit will first check the usage table, if applicable, for no conflicting usage and then set the related LED blinking. If the push-button activation is intended, the local operator will push the button one more time to trigger the action and the related LED will be set on. Once the action is completed, the related LED will be set off.

One of the preferred methods regarding WSA remote front-panel switching services can be implemented such that any remote computer can take control of TeamManager or any of the TeamProcessors via external modem attached to workgroup-based serial link based on encrypted proprietary access codes. Once the communication is established, the remote computer can perform all the same functions as a LAN-based management console computer.

One of the preferred methods regarding WSA device-sharing services can be implemented such that peripheral devices in a WSA can be accessed by TeamManager and any of other TeamProcessors. When a particular TeamProcessor needs to access any of the peripherals, such as a printer, the TeamProcessor sends a request message through COM2 of RAP to its control unit, and the control unit will send a request to the main control unit via internal $I^2C$ link. If available after checking the status and usage table, the main control unit will allow the subsequent communication from that particular control unit to the main control unit and the main control unit will relay the data to the attached printer via built-in parallel interface. Similar processes can be implemented for other serial-port devices. However, for a USB device, a particular TeamProcessor sends a request through COM2 of RAP to its control unit and the control unit will sent it to the main control unit. If available after checking the usage table for USB device, the main control unit will send an OK signal back to that control unit, which further turns on the USB switch on board. In so doing, the USB interface on that particular TeamProcessor can directly hook up with the workgroup-based USB device, such as Camcorder, via the common USB bus.

One of the preferred methods regarding WSA fail-over scheme-based services can be implemented such that mission critical components in a WSA, such as TeamChassis, TeamPanel, TeamProcessor, TeamServer, are either fault-tolerant or fail-over capable, so that mission critical applications won't be disrupted.

As for TeamPanel, the mission critical capability is related to its main control unit, which has dual microprocessors, so if the first one should fail, the second one can take over and send an alarm to TeamManager, which can further notify the management console. As for TeamChassis, it is fault-tolerant due to the fact that it is equipped with dual power supplies and external UPS. As for TeamProcessors, there are four fail-over groups, i.e., TP1 and TP2, TP3 and TP4, TP5 and TP6, TP7 and TP8, because each group member has the same hardware configuration as the other. Thus, in each group, if one should fail, the other will take over or vice versa. Therefore, if TeamManager TP8 has failed, the TP7 will take over as TeamManager. Moreover, the TP1–TP2 pair and the TP3–TP4 pair are both fail-over groups. TP5–TP6 pair and TP7–TP8 pair are also fail-over groups. If TP1–TP2 pair should fail, TP3–TP4 pair will take over, or vice versa. The same scenarios also apply to the TP5–TP6 pair and to the TP7–TP8 pair.

As for file-service-based TeamServers, there are eight (8) fail-over groups, i.e., IDE1 in TeamProcessor1 and TeamServer1, IDE2 and TeamServer2, IDE3 and TeamServer3, IDE4 and TeamServer4, IDE5 and TeamServer5, IDE6 and TeamServer6, IDE7 and TeamServer7, IDE8 and TeamServer8. Therefore if the TeamServer1 should fail, other TeamProcessors still can get the information from TeamProcessor1 on the IDE1. If IDE1 should fail, other TeamProcessors can get the information directly from TeamServer1. The same scenario applies to the other seven (7) fail-over groups. As for database-service-based TeamServers, Database on TeamServer5 is controlled by TP5 and Database on TeamServer7 is controlled by TP7 and are basically the same application-specific databases, as discussed earlier. However, if Database-TP5 should fail, Database-TP7 will immediately be updated by TeamProcessor7, based on all the related batch files collected from TeamServer1 to TeamServer8 and instantly become ready for services.

One of the preferred methods regarding WSA application-based load balancing services can be implemented such that application-based TeamProcessors in a WSA can be load-balanced by using TeamPanels. In a web-based environment, application-based query-based requests come from the Internet using HTTP protocol. The incoming query-based traffic will first go through the routers. The router then sends all the requests to TeamManager TP8. TeamManager then can distribute incoming traffic loads to TP1, TP2, TP3 and TP4 via internal FTP port or proprietary ports via workgroup peer-to-peer link using Ethernet. In a round-robin implementation, TeamManager (TP8) maintains a round-robin-based load-balance status table and the main control unit of the TeamPanel maintains various vital sign status tables, based on each application-based Team-Processor's CPU usage and response time.

Since any workgrouped TeamProcessor will routinely transfer vital signs and the like to its attached control unit via COM2 of RAP, the control unit will repack the data and notify the main control unit. Once the main control unit allows the linkage to take place, the basic control unit can download the data to main control unit's memory buffers, which can be allocated for various vital-sign status tables. Based on these real-time status tables, the main control unit can detect which TeamProcessor may have failed or overloaded. When any of the situations happens, the main control unit will report it to TeamManager. If it is an overloaded situation, TeamManager will immediately try to take out the TeamProcessor in question from the round-robin sequence, until the notice from the main control unit is again received as to returning that particular TeamProcessor back into the round-robin sequence. If it is a failed situation, TeamManager will try to establish the communication with that particular TeamProcessor in question via workgroup peer-to-peer link. If there is no response, then the TeamManager will notify the main control unit to reset the TeamProcessor via the "reset" line of RAP, resulting in partial or full recovery and acting accordingly.

In addition to round robin fashion, there are other intelligent algorithms, such as "least open connections", "fastest measured time or response time", "content type", the number of open connections, and other statistics gathered from application servers". Since TeamManager TP8 can gather these types of information via workgroup peer-to-peer link one by one and detect the failed TeamProcessor(s), various algorithms can be implemented intelligently without overloading one particular TeamProcessor and without sending load to the failed TeamProcessor. However, the round-robin algorithm will be the best choice, if all the TeamProcessors are of the same kind, and TeamManager will only have to react to the instructions from the main control unit of the TeamPanel based on abnormal situations.

One of the preferred methods regarding WSA file and database services can be implemented such that the file and database on any particular TeamServer can be directly accessed and shared among TeamProcessors. It is done by installing as many read-only database engines on as many TeamProcessors for direct access-based secondary TeamServers, and the primary TeamProcessor will be installed with the full-fledged database engine, which can have the absolute privileges applied to the database on its primary TeamServer. In addition, TeamManager (TP8) keeps a series of status and usage tables for all the facilities attached. One of the tables keeps a concurrent listing of every TeamServer's primary TeamProcessor, so that there will be no double-write data-integrity breakdown occurring on any of the TeamServers. However, any particular TeamServer's primary TeamProcessor can be changed to another TeamProcessor, due to fail-over, different operation needs in different time-zones and temporary supervisory change for upgrade, etc. TeamManager will always ensure that there is only one TeamProcessor that can update a particular TeamServer at any given time.

One of the preferred methods regarding WSA security services can be implemented such that any unauthorized intrusions into a WSA will be detected. Since TeamManager TP8 will be receiving all the incoming requests and distribute the load among TeamProcessors, it is imperative that TeamManager should be installed with security enhancement and firewall capability to ward off any possible external attacks. Basically, TeamManager TP8 can filter out any questionable incoming request by implementing either SSL-based, or OS-based or higher-level application-based access-encrypted security measures, and redirecting those legitimate requests to those application-based TeamProcessors via workgroup peer-to-peer link using Ethernet, segregating into two different security-based zones. Each application-based TeamProcessor comes up with the reply, which may involve accessing the application-specific database and sends it back to the requester by including the correct internal IP address with content-encrypted security measures. Thus, TeamManager can decrypt the content and redirect to the right TeamProcessor, which handles the previous request. This type of sticky port approach, known as persistent session-based on factors such as source IP address and special information contained in the user-authentication-device request protocol or in returned cookies, can also be securely implemented, which is essential for running web-based e-commerce application services efficiently.

One of the preferred methods regarding WSA fail-over services can be implemented such that a number of agent-based management software programs, i.e., TeamSoft are devised to be incorporated with all the above functional services based on the defined data structure and data flow of the preferred configuration. Only the current TeamManager will be installed with the server-portion of TeamSoft, while the rest of the TeamProcessors will be installed with the client-portion of TeamSoft. As long as there is one TeamProcessor active, the remote management console computer can take control of that TeamProcessor and make it serve as TeamManager, so that it can reboot any failed TeamProcessor, and the inventive workgroup server array may be back to functioning normally. Based on TeamSoft fail-over capability, each TeamProcessor can initiate the detection based on whether its fail-over counterpart is alive via TeamManager. If not alive, then that TeamProcessor will assume the tasks that its failed counterpart was servicing. For example, if TP5 should fail, TeamManager will assign TP6 with the privilege of TeamServer5 and the task to update the database. If TP6 should fail, TeamManager will assign TP5 the privilege of TeamServer6 and redirect TP6 traffic to TP5 by notifying incoming requests with TP5 IP address instead of TP6. The TeamSoft also includes workgroup diagnosis of problems with automatic corrective action built-in.

One of the preferred methods regarding WSA performance-gauging services can be implemented such that the optimal performance in a WSA can be obtained by adjusting the values of some key parameters. The inventive workgroup server array performance is hinged upon the following three factors: 1) TeamManager firewall operation, 2) the number of application-based TeamProcessors, 3) the size of the application-specific database. If the firewall operation installed in TeamManager TP8 takes too much time in fulfilling content decryption security and upper layer access-based security, it will decrease the number of incoming requests per minute. However, this issue can be resolved by attaching fire-wall-based routers, which can perform network layer filtering and also upper layer filtering.

If the number of application-based TeamProcessors decreases, the number of outgoing replies per minute will decrease. As for the database concern, if the application-centric database is constructed based on non-loyalty traffic, it tends to render out only ready-made information, which may grow occasionally for satisfying non-loyalty based traffic. On the other hand, if constructed based on loyalty traffic, the database is going to grow considerably. However, the time need to retrieve the data from the database for forming up a reply page is not an issue, because the database on a TeamServer can; be readily accessible without depending on any other Team Processor.

Therefore, there are two scenarios: 1) non-loyalty application-based and 2) loyalty application-based. In the non-loyalty-based situation, the optimal performance of the inventive workgroup server array is dependent on the number of application-based TeamProcessors. Based on the computing power and the complex degree of service, one TeamProcessor can handle X number of incoming requests and reduce outgoing replies in one minute without degrading the service, which is considered as the acceptable quality of service (QOS). Therefore, four TeamProcessors can accommodate 4X number of incoming requests in a steady state operation. If the peek-time non-loyalty traffic can jump to 6X, the inventive workgroup server array can still accommodate the peek-time operation by assigning TP6 and TP7 as application-based TeamProcessors and joining the round robin load-balancing algorithm operated by TeamManager.

Furthermore, as shown in FIG. 2C, a 12-TeamProcessor-based workgroup server array, in which eight (8) out of twelve (12) are application-based TeamProcessors, can accommodate 8X number of non-loyalty traffic in a steady state operation and 10X number of traffic in a peek-time operation. If the incoming traffic is more than 10X, then the second workgroup server array is needed.

In a loyalty-based situation, the optimal performance of the inventive workgroup server array is dependent on the number of application-based TeamProcessors and the size of the loyalty-based database. If the size of the database is too large and the number of incoming requests generated is more than all the TeamProcessors can handle, then the database needs to be downsized to satisfy the steady state operation and the excess should move to the second workgroup server array. For example, a 12-TeamProcessor based workgroup server array can accommodate 8X number of loyalty-based traffic, which can be converted into Y number of loyalty-based users that can be installed on the application-centric database. In the peek-time situation, Y number of users will generate 10X number of loyalty-based traffic, which still meets the acceptable QOS.

The inventive workgroup server array can always re-adjust X and Y number to ensure the acceptable Quality-of-Service, based on the information gathered by TeamManager. Therefore, the performance measurements for the inventive workgroup server array are parameters X and Y, and the optimal operating point as well as the prediction of problems for needing increased resource, call be derived.

For higher bandwidth application, the degree of service is higher, which may lower the number of X and Y. However, the QOS of the inventive workgroup server array will still be intact.

To accommodate more incoming requests of a same application in a loyalty-based scenario, FIG. 3B illustrates a workgroup server cluster comprising a plurality of single-application-based workgroup server arrays, each having a mutually exclusive database segment. Since each workgroup server array is QOS capable, the overall workgroup server cluster is also QOS capable.

By doing so, a highly available and scalable mission critical web-based application can be accommodated by a workgroup server cluster, which contains the first workgroup server array, up to the nth workgroup server array. Since it is loyalty-based, the router can immediately distribute the right incoming traffic to the right TeamManager based on the right IP address, because this information is either installed in the "cookies" of their browsers or in the chip-based smart cards that can be used for network access and user-authentication.

For non-loyalty-based situation, the router together with the Domain Name Server (DNS), which converts the URL into IP addresses, can distribute the incoming load to a non-loyalty-based workgroup server cluster's multiple TeamManagers by using the built-in round-robin capability. In so doing, the load balancing for non-loyalty-based traffic is implemented and the QOS is also intact. This unique method based on workgroup server cluster-based load balancing together with round-robin-based DNS, creates obvious benefit to eliminate the global load balancer, which has to be powerful enough to load balance and manage all the web application servers, creating unnecessary network traffic to overload inter-tiered network switches. Furthermore, if any TeamManager should fail, the DNS will send the message to the TeamManager's fail-over counterpart, which will be automatically assigned to take over and handle the incoming traffic from the DNS because the DNS notifies both IP addresses of TeamManager and its fail-over counterpart.

For either the loyalty-based or the non-loyalty-based scenario, the database server program should be fast and simple to run, without having the need of complicated intelligence built in because the web-based application is well defined and the database associated with it should also be well defined. The time spent for data retrieval should be as short as possible, so that X and Y can be larger numbers yielding better performance.

Since the incoming requests from a user/surfer may involve many different web-based applications, a plurality of different application-based workgroup server clusters should be installed. Shown in FIG. 4 is a preferred embodiment of an overall web-server system for highly available and scalable mission critical Intranet, Extranet and Internet applications, integrating with multiple serial-chained and parallel-chained workgroup server clusters and creating an ideal and secure distributed computing environment.

In addition to zone-based security using firewall based workgroup server array, the inter-communication among different workgroup server clusters can be implemented securely by using proprietary port with SSL-based, OS-based or application-based content and access security measures, so that any foreign communication won't be allowed to access any workgroup server cluster.

Furthermore, by using FC-AL or the like to link all the TeamManagers, each workgroup server array's TeamServers, whether hard disk-based, tape-based or optical-disk-based, can all be converted as FC devices, which can then be accessed and maintained by any of the SAN-based (Storage Area Network) backend database processors. In doing so, every workgroup server array's application-centric file and database servers or data caching servers for the backend data center SAN-based sophisticated file and database servers are equipped with more intelligent database engines.

In conclusion, the present invention incorporates a number of unique components: 1) TeamProcessors, 2) TeamServers and TeamServer cards, 3) TeamPanels, 4) TeamLink cards, 5) TeamChassis, and 6) TeamRack. Based on these unique components, the present invention also employs a number of unique methods to build the preferred workgroup server arrays. They are 1) WSA server-pair method, 2) WSA multi-workgroup link method, 3) WSA server coordination and supervisory method, 4) WSA internal, onsite and remote "front-panel" switching method, 5) WSA device sharing method, 6) WSA fail-safe and recovery method, 7) WSA load balancing method, 8) WSA file/database sharing method, 9) WSA security-based method, 10) WSA TeamSoft-based management method, and 11) WSA optimal performance-gauging method. Moreover, based on those inventive workgroup server arrays, the present invention employs a number of unique methods to build the preferred workgroup server clusters (WSC). They are 1) WSC structure method, 2) WSC load balancing method, 3) WSC cache-centric database method, 4) WSC user-authentication-loyalty-centric workgroup database method. Lastly, based on those inventive workgroup server clusters, the present invention employs a number of unique methods to build the preferred "Front-Office" web-based server farms. They are 1) multiple WSCs serial-chained method, 2) multiple WSCs parallel-chained method, 3) Multiple serial-chained and parallel-chained WSCs linked with storage area network (SAN) method.

As will now be understood, the present invention provides a workgroup server array and its related architecture for building various highly available, scalable and mission-critical server clusters in a secure distributed computing environment.

Additional advantages and modifications will readily occur to those skilled in the art. The invention in its broader aspects is therefore not limited to the specific details, representative apparatus, and illustrative examples shown and described. Accordingly, departures may be made from such details without departing from the spirit or the scope of Applicant's general inventive concept. The invention is defined in the following claims.

What is claimed is:

1. A multiple processor computer system comprising a plurality of TeamProcessors each having a multiple CPU computing platform, said platform having RAM and respective modules for interface with a monitor, audio, speaker, access ports, USB, network link, a workgroup peer-to-peer link, peripheral drives and a workgroup server link;

said workgroup server link of each said TeamProcessor being connected to a shared plurality of workgroup servers.

2. The computer system recited in claim 1 wherein each said workgroup server is a fault tolerant disk array.

3. The computer system recited in claim 1 further comprising at least one chassis housing at least four of said TeamProcessors and at least two of said workgroup servers.

4. The computer system recited in claim 1 comprising at least eight of said TeamProcessors and at least four of said workgroup servers; each of said TeamProcessors being in communication with each of said workgroup servers.

5. The computer system recited in claim 1 further comprising at least one TeamPanel having a plurality of control CPUs, each CPU interfacing with a corresponding TeamProcessor, each CPU controlling a plurality of switches for selectively connecting the corresponding TeamProcessor to USB devices, a monitor, audio speakers, a keyboard, a mouse, a modem, a printer and serial devices.

6. The computer system recited in claim 5 further comprising a plurality of said TeamPanels cascaded together for interfacing an increased number of said TeamProcessors.

7. The computer system recited in claim 5 further comprising at least one additional one of said control CPUs designated as a first main control unit and providing supervision for access to shared buses and devices for said TeamProcessors and for load balancing among said TeamProcessors.

8. The computer system recited in claim 7 further comprising a second main control unit for failure mode backup of said first main control unit.

9. The computer system recited in claim 7 wherein one of said TeamProcessors, designated the TeamManager, controls said TeamPanel.

10. The computer system recited in claim 1 wherein at least one of said workgroup servers is devoted primarily to application file service and at least one other of said workgroup servers is devoted primarily to database file service.

11. The computer system recited in claim 10 wherein said application file service-devoted workgroup server provides a capability for servicing application-oriented requests.

12. The computer system recited in claim 10 wherein said database file service-devoted workgroup server provides a capability for servicing database-oriented requests.

13. The computer system recited in claim 10 wherein each of said workgroup servers provides for generating batch files written into a peripheral drive for fail-safe operation.

14. The computer system recited in claim 10 comprising at least another workgroup server providing both application file service and database file service for fail-safe operation.

15. The computer system recited in claim 1 wherein each TeamProcessor recognizes one workgroup server as primary and all remaining workgroup servers as secondary.

16. The computer system recited in claim 1 wherein said workgroup peer-to-peer link is based upon Ethernet or SCSI interfaces and wherein said workgroup server link is based upon a SCSI interface.

17. The computer system recited in claim 1 wherein one of said TeamProcessors designated TeamManager, monitors the status of each of the remaining TeamProcessors.

18. The computer system recited in claim 1 wherein each said workgroup server is directly accessible to at least one of said TeamProcessors.

19. A workgroup server array system comprising:

a plurality of groups of TeamProcessors, each TeamProcessor having a multiple CPU computing platform, each group comprising a plurality of TeamProcessors and being connected to a TeamPanel for interface with VGA monitors, keyboards, audio speakers and serial buses; each said group being connected to a workgroup server link; a plurality of direct access workgroup servers connected to said groups of TeamProcessors by said workgroup server link; said groups being interconnected to a workgroup Ethernet hub through a workgroup peer-to-peer link; said groups also being connected to a local area network through a workgroup Ethernet switch.

20. The workgroup server array system recited in claim 19 wherein each said workgroup server is a fault tolerant disk array.

21. The workgroup server array system recited in claim 19 further comprising at least one chassis housing at least four of said TeamProcessors and at least two of said workgroup servers.

22. The workgroup server array system recited in claim 19 comprising at least eight of said TeamProcessors and at least four of said workgroup servers; each of said TeamProcessors being in communication with each of said workgroup servers.

23. The workgroup server array system recited in claim 19 further comprising at least one TeamPanel having a plurality of control CPUs, each CPU interfacing with a corresponding TeamProcessor, each CPU controlling a plurality of switches for selectively connecting the corresponding TeamProcessor to USB devices, a monitor, audio speakers, a keyboard, a mouse, a modem, a printer and serial devices.

24. The workgroup server array system recited in claim 23 further comprising a plurality of said TeamPanels cascaded together for interfacing an increased number of said TeamProcessors.

25. The workgroup server array system recited in claim 23 further comprising at least one additional one of said control CPUs designated as a first main control unit and providing supervision for access to shared buses and devices for said TeamProcessors and for load balancing among said TeamProcessors.

26. The workgroup server array system recited in claim 25 further comprising a second main control unit for failure mode backup of said first main control unit.

27. The workgroup server array system recited in claim 25 wherein one of said TeamProcessors, designated the TeamManager, controls said TeamPanel.

28. The workgroup server array system recited in claim 19 wherein at least one of said workgroup servers is devoted primarily to application file service and at least one other of said workgroup servers is devoted primarily to database file service.

29. The workgroup server array system recited in claim 28 wherein said application file service-devoted workgroup server provides a capability for servicing application-oriented requests.

30. The workgroup server array system recited in claim 28 wherein said database file service-devoted workgroup server provides a capability for servicing database-oriented requests.

31. The workgroup server array system recited in claim 28 wherein each of said workgroup servers provides for generating batch files written into a peripheral drive for fail-safe operation.

32. The workgroup server array system recited in claim 28 comprising at least another workgroup server providing both application file service and database file service for fail-safe operation.

33. The workgroup server array system recited in claim 19 wherein each TeamProcessor recognizes one workgroup server as primary and all remaining workgroup servers as secondary.

34. The workgroup server array system recited in claim 19 wherein said workgroup peer-to-peer link is based upon Ethernet or SCSI interfaces and wherein said workgroup server link is based upon a SCSI interface.

35. The workgroup server array system recited in claim 19 wherein one of said TeamProcessors designated TeamManager, monitors the status of each of the remaining TeamProcessors.

36. The workgroup computer array system recited in claim 19 wherein each said workgroup server is directly accessible to at least one of said TeamProcessors.

37. In a multiple processor computer system having a plurality of TeamProcessors each having a multiple CPU computing platform and a workgroup server link connecting the TeamProcessor to a shared plurality of direct access team servers, a method of team server coordination and supervision, the method comprising the steps of:

selecting a first one of said TeamProcessors as TeamManager;

employing said selected TeamManager to monitor the status of all of the remaining TeamProcessors;

each TeamProcessor sending its status information to said TeamManager;

said TeamManager compiling a management-based status table corresponding to status information received from said TeamProcessors.

38. The method recited in claim 37 wherein each of said TeamProcessors is connected through a VGA link to a common monitor and further comprising the steps of:

using said TeamManager to monitor diagnostics of each of said Team Processors;

capturing the VGA link of any failed TeamProcessor by the TeamManager; and having said TeamManager reset a failed TeamProcessor.

39. The method recited in claim 37 further comprising the steps of allocating at least one TeamProcessor for load balancing; allocating at least one TeamProcessor for database service; allocating at least one other TeamProcessor for application-specific services.

40. The method recited in claim 37 further comprising the step of pairing the TeamProcessors to provide fault tolerant takeover by one TeamProcessor for another of a pair.

41. The method recited in claim 37 wherein said computer system has an additional apparatus for monitoring TeamProcessor status; the method further comprising the steps of:

employing said additional apparatus for monitoring status of said TeamProcessors;

said additional apparatus being the final arbitrator of load balancing among said TeamProcessors;

said additional apparatus instructing said TeamManager to alter load distribution among said TeamProcessors to achieve said load balancing.

42. The computer system recited in claim 19 wherein each TeamProcessor is associated with one of said servers as a primary server and is associated with the remaining servers as secondary servers.

43. The computer system recited in claim 42 wherein each primary server for a selected TeamProcessor provides full function database accessibility to its selected TeamProcessor and provides read-only database accessibility to all other said TeamProcessors.

44. The computer system recited in claim 19 wherein some of said TeamProcessors are application-based and some of said TeamProcessors are database-based, and wherein some of said servers are application-based servers and some are database servers; the system further comprising:

means for adjusting the number of application-based TeamProcessors and servers to optimize the quality of performance for incoming traffic.

45. A workgroup server cluster having a plurality of interconnected workgroup server arrays, each such server array comprising:

a plurality of groups of TeamProcessors, each TeamProcessor having a multiple CPU computing platform, each group comprising a plurality of TeamProcessors and being connected to a TeamPanel for interface with VGA monitors, keyboards, audio speakers and serial buses; each said group being connected to a workgroup server link; a plurality of direct access workgroup servers connected to said groups of TeamProcessors by said workgroup server link; said groups being interconnected to a workgroup Ethernet hub through a workgroup peer-to-peer link; said groups also being connected to a local area network through a workgroup Ethernet switch.

46. The workgroup server cluster recited in claim 45 further comprising a round robin server for balancing the load among said plurality of workgroup server arrays.

47. The workgroup server cluster recited in claim 46 further comprising a Domain Name Server for distributing incoming traffic.

48. The workgroup server cluster recited in claim 45 wherein each said workgroup server array provides a workgroup database which is duplicative of every other workgroup server array workgroup database in said workgroup server cluster.

49. The workgroup server cluster recited in claim 45 wherein each said workgroup server array provides a unique workgroup database.

50. The workgroup server cluster recited in claim 45, said cluster being upwardly scaleable by serial and parallel connection to a plurality of additional workgroup server clusters for high availability mission critical applications.

* * * * *